(12) United States Patent
Naniwa et al.

(10) Patent No.: US 8,456,965 B2
(45) Date of Patent: Jun. 4, 2013

(54) THERMALLY ASSISTED MAGNETIC RECORDING HEAD

(75) Inventors: Irizo Naniwa, Fujisawa (JP); Takuya Matsumoto, Hachioji (JP); Yukio Kato, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 179 days.

(21) Appl. No.: 12/957,560

(22) Filed: Dec. 1, 2010

(65) Prior Publication Data

US 2011/0128828 A1    Jun. 2, 2011

(30) Foreign Application Priority Data

Dec. 2, 2009   (JP) ................................ 2009-274437

(51) Int. Cl.
*G11B 11/00*   (2006.01)
(52) U.S. Cl.
USPC ................. 369/13.33; 369/13.13; 369/112.27

(58) Field of Classification Search
USPC .......... 369/13.33, 13.32, 13.24, 13.14, 13.03, 369/13.02, 13.17, 112.27, 112.01, 13.13, 369/13.23; 360/59, 125.31, 125.74
See application file for complete search history.

(56) References Cited

U.S. PATENT DOCUMENTS

| | | | | |
|---|---|---|---|---|
| 7,880,996 B2* | 2/2011 | Stipe | ............................... | 360/59 |
| 8,031,561 B2* | 10/2011 | Hellwig et al. | ............ | 369/13.01 |
| 8,169,881 B2* | 5/2012 | Balamane et al. | ....... | 369/112.27 |
| 2009/0052076 A1 | 2/2009 | Shimazawa et al. | | |
| 2010/0165499 A1* | 7/2010 | Stipe | ............................... | 360/59 |

FOREIGN PATENT DOCUMENTS

JP     2009-54205 A     3/2009

* cited by examiner

*Primary Examiner* — Ali Neyzari
(74) *Attorney, Agent, or Firm* — Mattingly & Malur, PC (57) ABSTRACT

A thermally assisted magnetic recording head is formed of a slider and a magnetic head. The magnetic head includes a main pole, a reader, a coil, a near-field transducer, and a waveguide. A metal film with high thermal conductivity is formed at both sides of the near-field transducer in a width direction of the magnetic head. The use of the metal film as a radiator plate ensures to prevent the temperature of the near-field transducer from becoming locally high.

14 Claims, 10 Drawing Sheets

THERMALLY ASSISTED MAGNETIC RECORDING HEAD

The present application claims priority from Japanese application serial No. 2009-274437, filed on (Dec. 2, 2009), the content of which is hereby incorporated by reference into this application.

BACKGROUND OF THE INVENTION

Field of the Invention

The present invention relates to a thermally assisted magnetic recording head, and more particularly, to a thermally assisted magnetic recording head for suppressing a temperature rise of a near-field transducer.

Thermally assisted magnetic recording is one of technologies for markedly improving the recording density of a magnetic disc device. The thermally assisted magnetic recording is employed for recording data in a disc by applying heat at the temperature of 200° C. or higher and a magnetic field to a microregion (several tens nm×several tens nm) on the disc. The use of laser beams converted into the near-field light by the near-field transducer disposed near the main pole has been considered as means for heating the microregion.

In the case of using the thermally assisted magnetic recording head, only a small percentage of the laser power, which has been applied and converted into the near-field light by the near-field transducer, contributes to heating of the disc. The rest of the laser power is absorbed by the material as a constituent of the near-field transducer for generating heat. Since the near-field transducer is enclosed by an alumina film with low thermal conductivity, the generated heat is kept inside. So the temperature of the near-field transducer becomes considerably high, with a local temperature of nearly 1000° C., which may damage the near-field transducer. The aforementioned local temperature rise causes thermal deformation and the head protrudes to be brought into collision against the disc, resulting in wear of the near-field transducer. The collision may cause adhesion of contamination onto the magnetic head.

A thermally assisted magnetic recording head has been introduced in JP-A No. 2009-54205 as the aforementioned prior art. The disclosed thermally assisted magnetic recording head is structured to have a main pole disposed at a side where the light is deflected by the waveguide, and the main pole end portion protrudes toward the side where the light is deflected. The waveguide protrudes from an air bearing surface to be higher than the main pole end portion, and has the near-field transducer formed at the leading end.

The protruding waveguide makes the main pole and the near-field transducer apart from each other in the normal direction of the air bearing surface, while making the main pole and the near-field transducer adjacent with each other in the in-plane direction. The structure makes it possible to suppress absorption of the laser beam by the main pole while effectively applying heat and magnetic field to the disc.

The aforementioned prior art is structured to suppress absorption of the laser beam by the main pole rather than suppressing absorption of the laser beam by the near-field transducer. So the temperature of the near-field transducer becomes considerably high, and thus the near-field transducer is damaged. The thermal deformation owing to the local temperature rise may cause the head to protrude to be brought into collision against the disc, resulting in wear of the near-field transducer. The collision further causes adhesion of contamination to the magnetic head. Since the structure has the protruding waveguide, the contact with the disc is highly likely to wear out the near-field transducer.

SUMMARY OF THE INVENTION

The present invention provides a thermally assisted magnetic recording head capable of preventing damage of the near-field transducer in the heat generated through absorption of the laser beam by the near-field transducer.

The present invention is structured to form a metal film near the near-field transducer on the air bearing surface of the thermally assisted magnetic recording head, connect a magnetic film (secondary magnetic pole) formed near the near-field transducer to the near-field transducer via a metal body on the air bearing surface of the thermally assisted magnetic recording head, and connect one end of a grounded metal wiring which is formed on the magnetic head to the near-field transducer. The aforementioned means may be arbitrarily combined.

The present invention allows release of the heat generated through absorption of the laser beam by the near-field transducer, thus preventing the temperature of the near-field transducer from becoming high.

DESCRIPTION OF THE PREFERRED EMBODIMENTS

Figure 1:
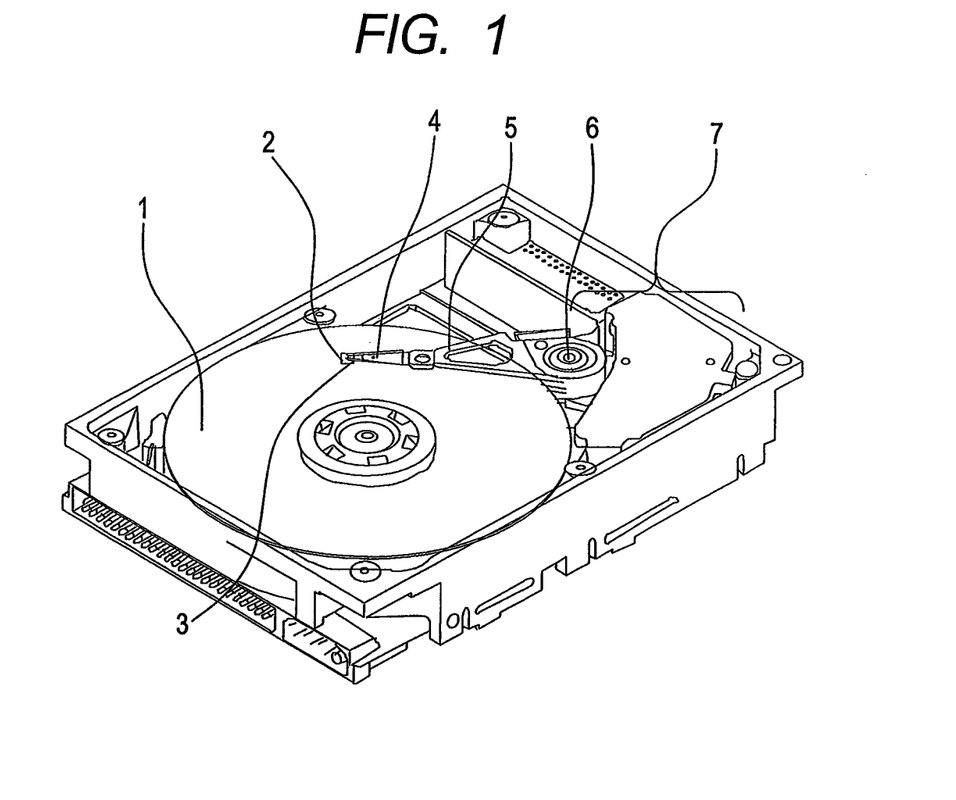
FIG. 1 is a perspective view of a magnetic disc device to which the present invention is applied.

A general structure of a magnetic disc device to which the thermally assisted magnetic recording head according to the present invention is applied will be described before explanation of embodiments of the present invention. FIG. 1 is a perspective view illustrating an inner structure of a magnetic disc device.

Referring to the drawing, a disc 1 is rotatably supported. A magnetic head 2 is formed at a leading end surface of a slider 3 to form a thermally assisted magnetic recording head which is kept above the recording surface of the disc 1 at a predetermined distance. The slider 3 is supported at a suspension 4. The suspension 4 is supported at a carriage arm 5 which is swingably supported at a pivot 6 as a rotary shaft. A voice coil motor 7 is driven to swing the carriage arm 5, and to move the thermally assisted magnetic recording head on a desired track of the rotating disc 1 for recording and reproducing the information.

Figure 2:
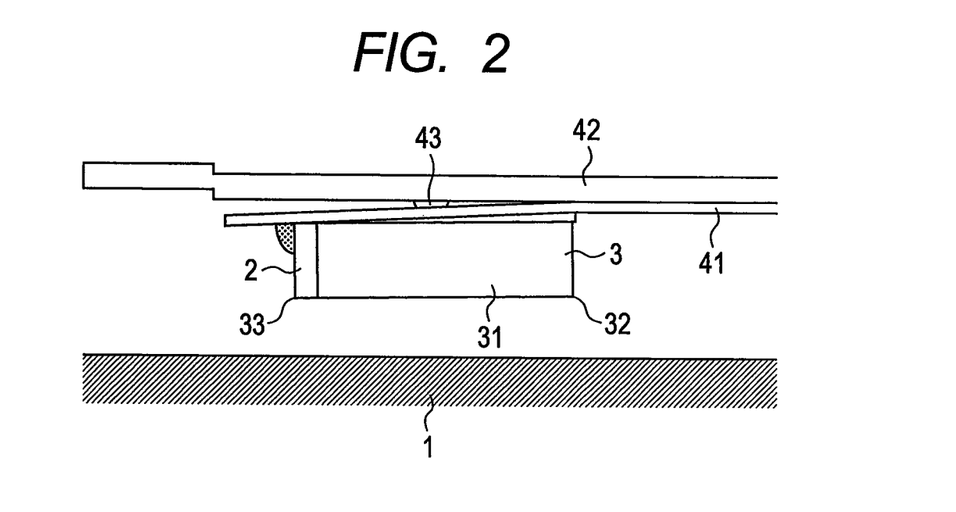
FIG. 2 is a side view illustrating a thermally assisted magnetic recording head and its periphery according to the present invention.

FIG. 2 is an enlarged side view of the thermally assisted magnetic recording head and its periphery shown in FIG. 1. Referring to the drawing, the suspension 4 is formed of a flexure 41 and a load-beam 42. The slider 3 connected to the flexure 41 of the suspension 4 receives a pressure force directed from the load-beam 42 to the disc 1 via a dimple 43 formed in the load-beam 42 of the suspension 4.

An air bearing surface 31 of the slider 3 has a step (not shown) formed therein. When a swirl flow of the disc 1 from a leading edge 32 to a trailing edge 33 of the slider 3 flows into the space between the disc 1 and the slider 3, positive and negative pressures are locally generated. Under the positive and negative pressures and the force exerted from the load-beam 42, the slider 3 is allowed to be kept above the disc 1 at a distance of several nanometers in a stable state.

First Embodiment

Figure 3:
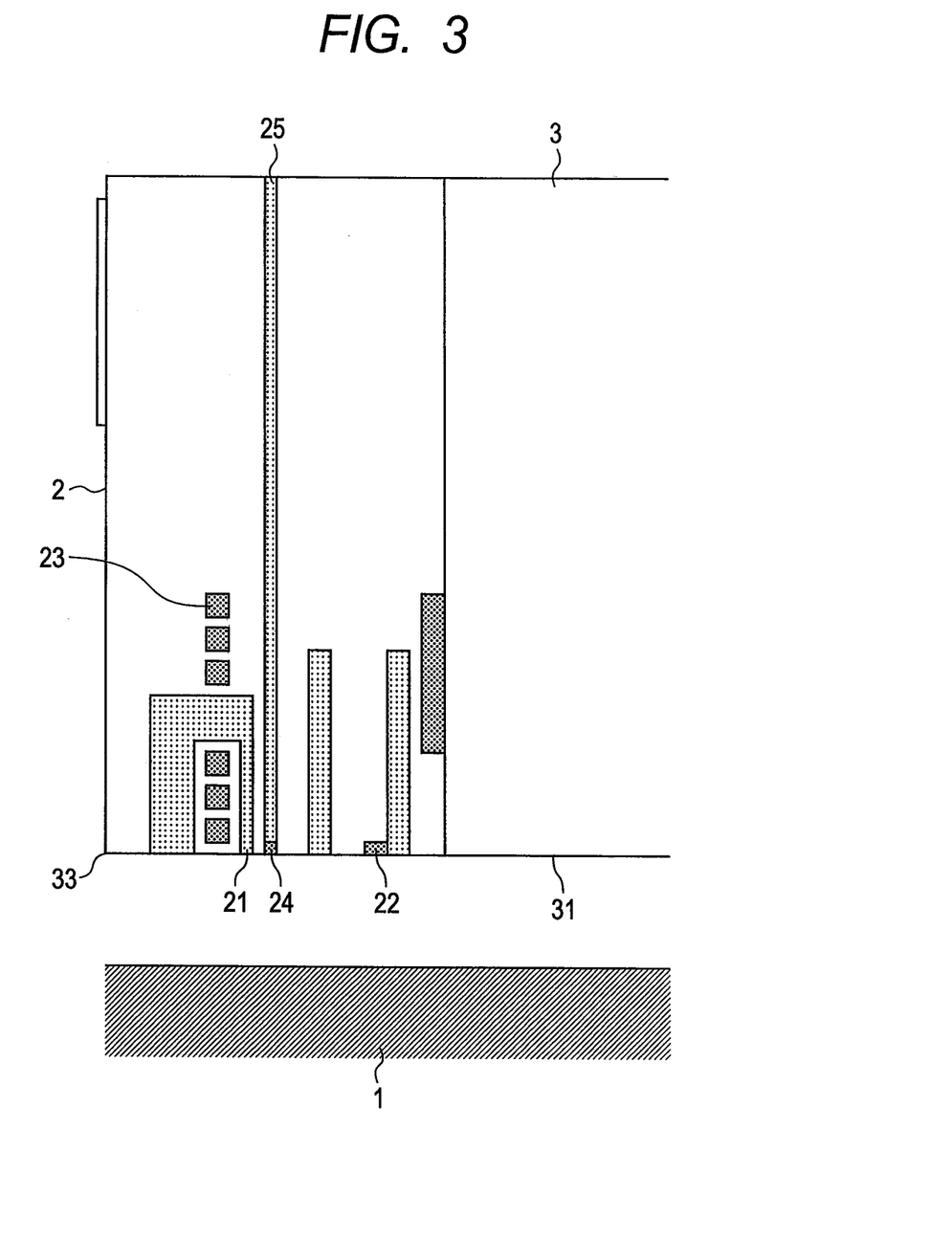
FIG. 3 is a partial cutaway view of the thermally assisted magnetic recording head according to a first embodiment of the present invention.
Figure 4:
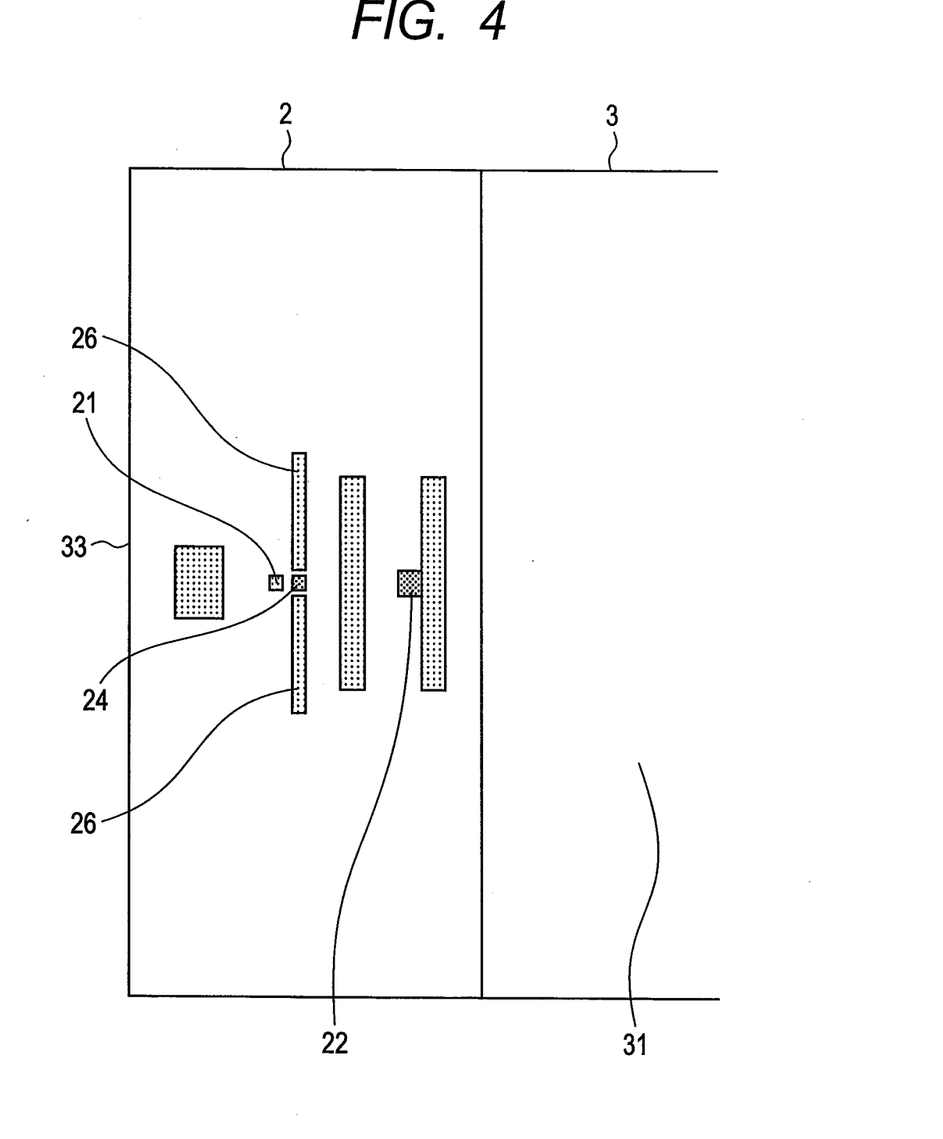
FIG. 4 illustrates the thermally assisted magnetic recording head according to the first and sixth embodiments of the present invention when seen from the air bearing surface.

A first embodiment of the thermally assisted magnetic recording head according to the present invention will be described referring to FIGS. 3 and 4. FIG. 3 is a cutaway view of the magnetic head 2 taken along the line for connecting midpoints of the leading edge 32 and the trailing edge 33 shown in FIG. 2. FIG. 4 is a view of the magnetic head 2 when seen from the air bearing surface 31. The magnetic head 2 includes a main pole 21, a reader 22, a coil 23, a near-field transducer 24 and a waveguide 25.

The thermally assisted magnetic recording head allows the near-field transducer 24 to generate the near-field light by irradiating a laser beam to the waveguide 25 to locally heat the disc 1 so that the coercive force at the heated point is lowered, and simultaneously allows the magnetic field to be generated at the leading end of the main pole 21 by applying the electric current to the coil 23. The information is recorded in the disc 1 by inverting the generated magnetic field.

However, only a small percentage of the applied laser power is converted into the near-field light by the near-field transducer 24, and the rest of the power is absorbed by the material as the constituent of the near-field transducer 24. Since the near-field transducer 24 is enclosed by an alumina film with low thermal conductivity, the generated heat is kept inside. So the local temperature of the near-field transducer becomes considerably high. The near-field transducer 24 partially melts and collides against the disc 1 owing to the local thermal deformation, resulting in wear of the near-field transducer 24, and adhesion of contamination thereto.

In the embodiment, a metal film 26 with high thermal conductivity is formed to extend from both sides of the near-field transducer 24 in the width direction of the magnetic head when seen from the air bearing surface 31. The metal film 26 serving as a radiator plate allows prevention of the temperature of the near-field transducer 24 from becoming locally high.

In the embodiment, the metal film 26 extends widthwise so as to be easily processed as the magnetic head 2 is formed through widthwise lamination with respect to the slider 3. However, the metal film 26 may be extended lengthwise or in another direction.

Figure 5:
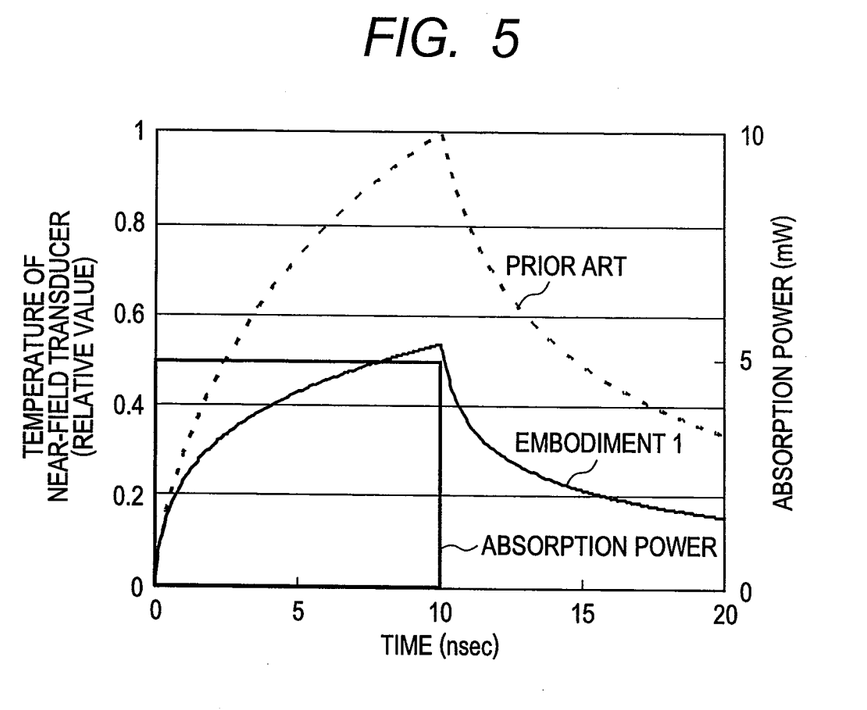
FIG. 5 is a graph representing an effect derived from the first embodiment of the present invention.

FIG. 5 is a graph representing comparison of change in the temperature of the near-field transducer 24 of the thermally assisted magnetic recording head between the present embodiment and the prior art when the same laser power is absorbed by the near-field transducer 24. The Y-axis denotes the temperature value relative to the maximum temperature of the generally employed thermally assisted magnetic recording head which is set to the value 1. The graph shows that the structure according to the embodiment is capable of suppressing the temperature rise of the near-field transducer 24.

The first embodiment allows release of the heat generated through absorption of the laser beam by the near-field transducer, thus preventing the temperature of the near-field transducer from becoming high. This may prevent wear of the near-field transducer or adhesion of the contamination thereto resulting from melting of the near-field transducer or its collision against the disc owing to the local thermal deformation. Then the thermally assisted magnetic recording for markedly improving the recording density of the magnetic disc device may be realized.

Second Embodiment

Figure 6:
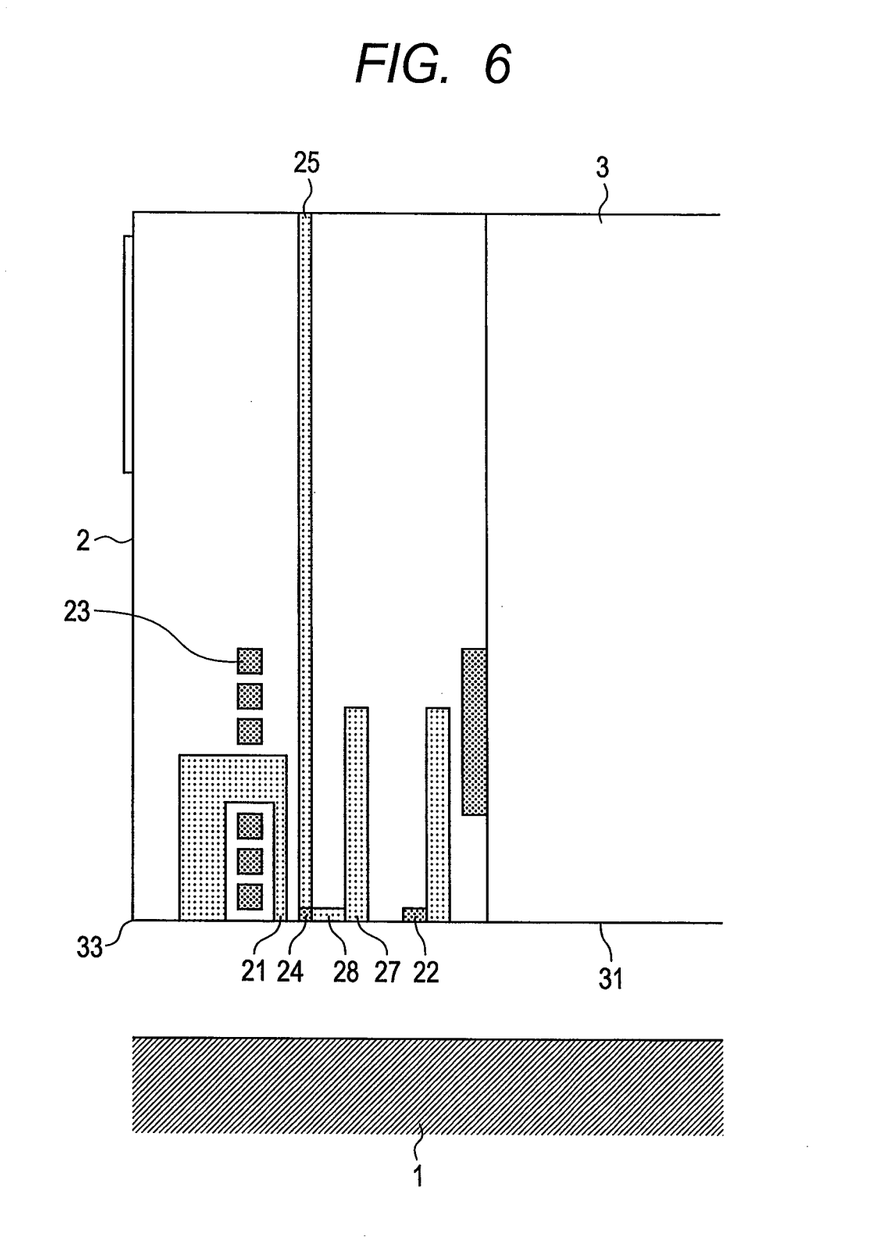
FIG. 6 is a partial cutaway view of a thermally assisted magnetic recording head according to a second embodiment of the present invention.
Figure 7:
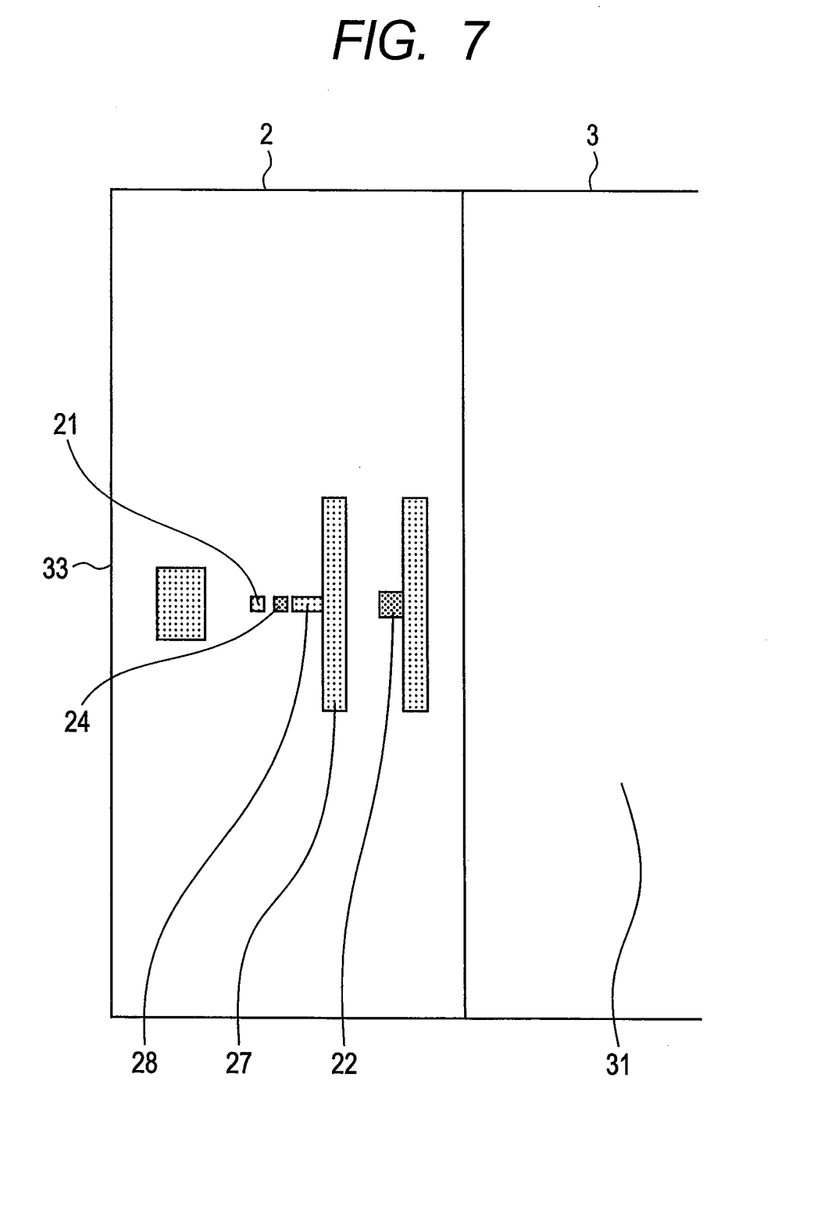
FIG. 7 illustrates the thermally assisted magnetic recording head according to the second embodiment of the present invention when seen from the air bearing surface.

A thermally assisted magnetic recording head according to a second embodiment of the present invention will be described referring to FIGS. 6 and 7. FIG. 6 is a cutaway view of the magnetic head 2 taken along the line for connecting midpoints of the leading edge 32 and the trailing edge 33 as shown in FIG. 2. FIG. 7 is a view of the magnetic head 2 when seen from the air bearing surface 31.

The magnetic head 2 includes the main pole 21, the reader 22, the coil 23, the near-field transducer 24 and the waveguide 25. A magnetic film (secondary magnetic pole) 27 is formed near the near-field transducer 24. In the embodiment, the magnetic film 27 and the near-field transducer 24 are connected via a metal body 28 with high thermal conductivity when seen from the air bearing surface 31. The structure releases the heat of the near-field transducer 24 to the magnetic layer 27 via the metal body 28. The use of the magnetic layer 27 serving as a heat sink/radiator plate prevents the temperature of the near-field transducer 24 from becoming locally high.

The device may be structured to release the heat to the main pole 21. However, the area of the main pole 21 seen from the air bearing surface 31 is too small to effectively serve as the radiator plate. It is also inadvisable to employ the aforementioned structure in view of the optical conversion efficiency and thermal deformation. The device may be structured to release the heat to the slider 3. However, the distance between the near-field transducer 24 and the slider 3 is too large to effectively establish the heat transfer.

Figure 8:
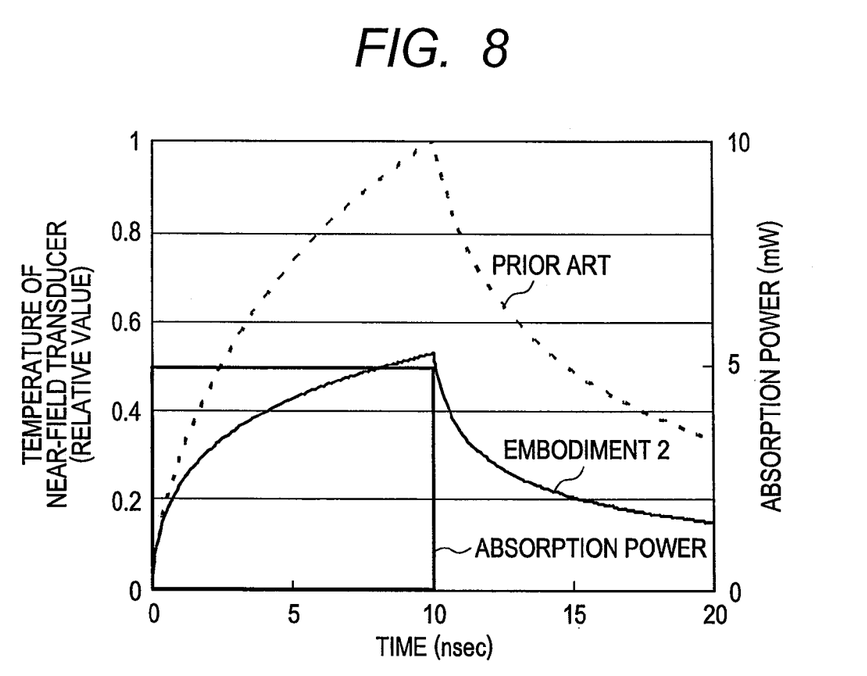
FIG. 8 is a graph representing an effect derived from the second embodiment of the present invention.

FIG. 8 is a graph representing the comparison of change in the temperature of the near-field transducer 24 of the thermally assisted magnetic recording head between the present embodiment and the prior art when the same laser power is absorbed by the near-field transducer 24. The Y-axis denotes the temperature value relative to the maximum temperature of the generally employed thermally assisted magnetic recording head, which is set to the value 1. The embodiment shows that it is capable of suppressing the temperature rise of the near-field transducer 24.

Like the first embodiment, the second embodiment allows release of the heat generated through absorption of the laser beam by the near-field transducer, thus preventing the temperature of the near-field transducer from becoming high. This may prevent wear of the near-field transducer or adhesion of the contamination thereto resulting from melting of the near-field transducer or its collision against the disc owing to the local thermal deformation. Then the thermally assisted magnetic recording for markedly improving the recording density of the magnetic disc device may be realized.

Third Embodiment

Figure 9:
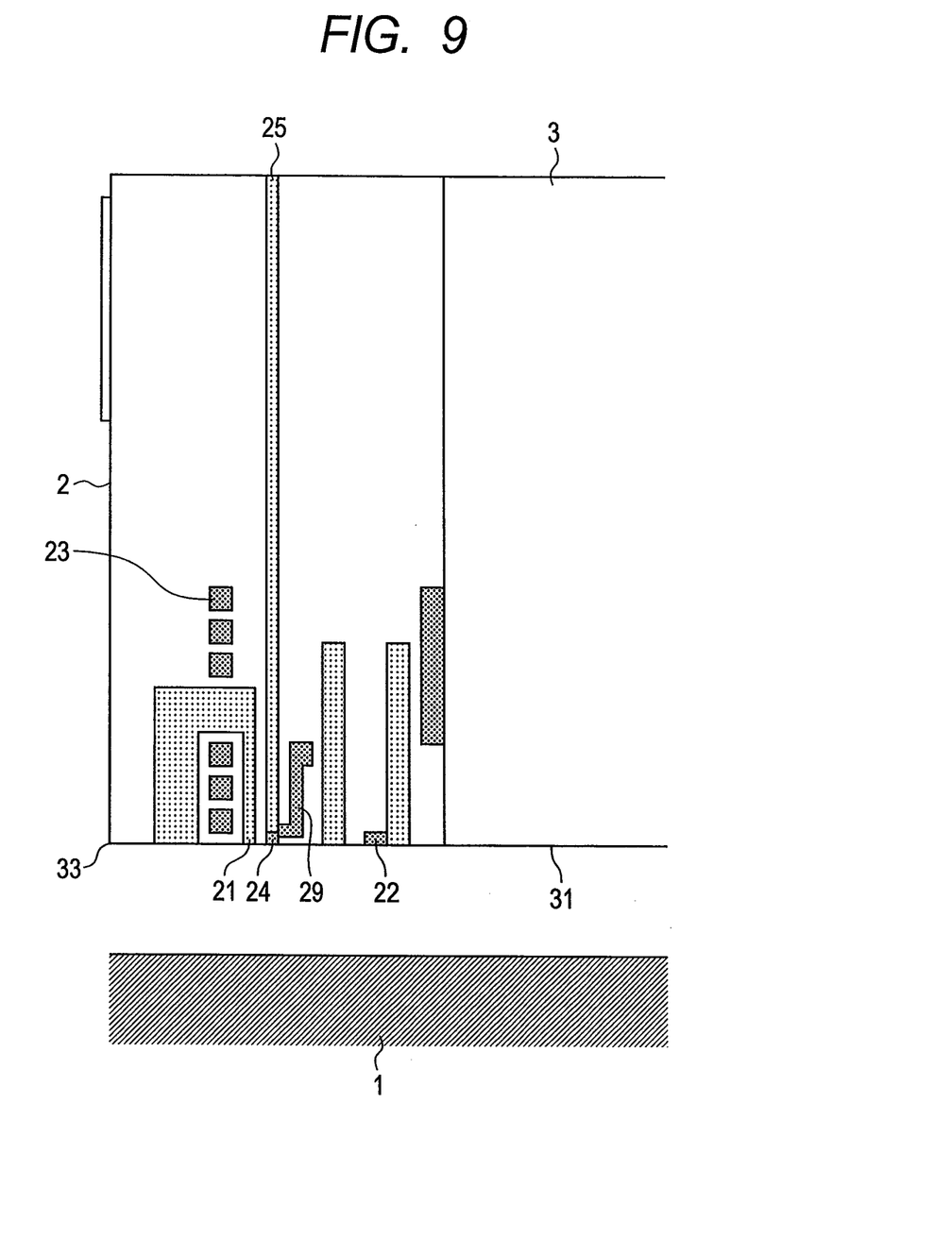
FIG. 9 is a partial cutaway view of the thermally assisted magnetic recording head according to third and sixth embodiments of the present invention.

A thermally assisted magnetic recording head according to a third embodiment of the present invention will be described referring to FIG. 9. FIG. 9 is a cutaway view of the magnetic head 2 taken along the line for connecting midpoints of the leading edge 32 and the trailing edge 33 shown in FIG. 2. The magnetic head 2 includes the main pole 21, the reader 22, the coil 23, the near-field transducer 24, the waveguide 25, and a metal wiring 29 in the magnetic head.

In the embodiment, the near-field transducer 24 is connected to the metal wiring 29 in the magnetic head. The metal wiring 29 is grounded for preventing the disc 1 from being damaged owing to discharge. The heat of the near-field transducer 24 is released to the metal wiring 29 in the magnetic head. The use of the metal wiring 29 in the magnetic head as a heat sink makes it possible to prevent the temperature of the near-field transducer 24 from becoming locally high.

Like the first embodiment, the embodiment allows release of the heat generated through absorption of the laser beam by the near-field transducer, thus preventing the temperature of the near-field transducer from becoming high. This may prevent wear of the near-field transducer or adhesion of the contamination thereto resulting from melting of the near-field transducer or its collision against the disc owing to the local thermal deformation. Then the thermally assisted magnetic recording for markedly improving the recording density of the magnetic disc device may be realized.

Fourth Embodiment

Figure 10:
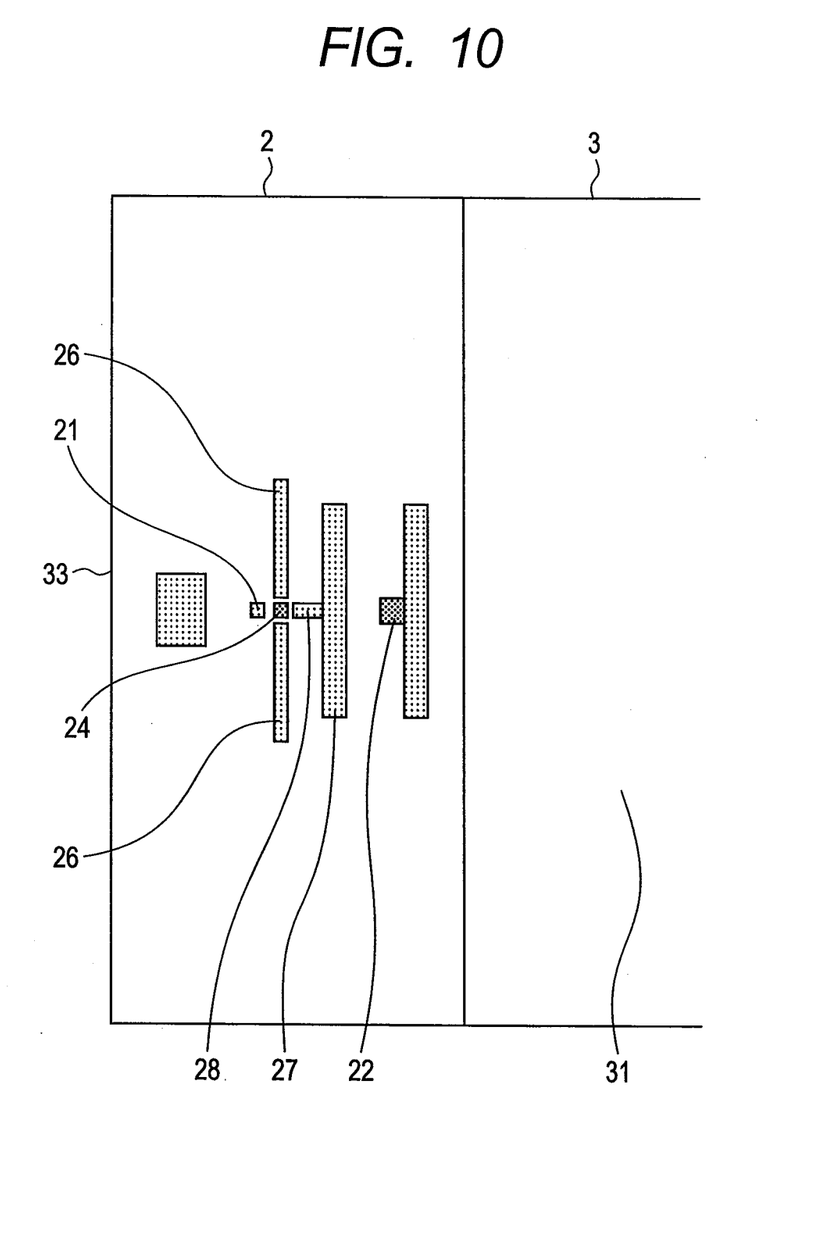
FIG. 10 illustrates the thermally assisted magnetic recording head according to fourth and seventh embodiments of the present invention when seen from the air bearing surface.

A thermally assisted magnetic recording head according to a fourth embodiment of the present invention will be described referring to FIG. 10 as a view illustrating the magnetic head 2 seen from the air bearing surface 31. The magnetic head 2 includes the main pole 21, the reader 22, the coil 23 (not shown), the near-field transducer 24, and the waveguide 25 (not shown). The magnetic film (secondary magnetic pole) 27 is formed near the near-field transducer 24.

In the embodiment, the metal film 26 with high thermal conductivity is formed to extend from both sides of the near-field transducer 24 in the width direction of the magnetic head when seen from the air bearing surface 31. When seen from the air bearing surface 31, the magnetic film 27 and the near-field transducer 24 are connected via the metal body 28 with high thermal conductivity. Since the metal film 26 is used as a radiator plate and the magnetic film 27 is used as a heat sink/radiator plate, the temperature of the near-field transducer 24 may be prevented from becoming locally high.

The aforementioned structure includes features derived from the first and the second embodiments, and is capable of further suppressing the temperature rise of the near-field transducer 24 compared with the first and the second embodiments.

Fifth Embodiment

Figure 11:
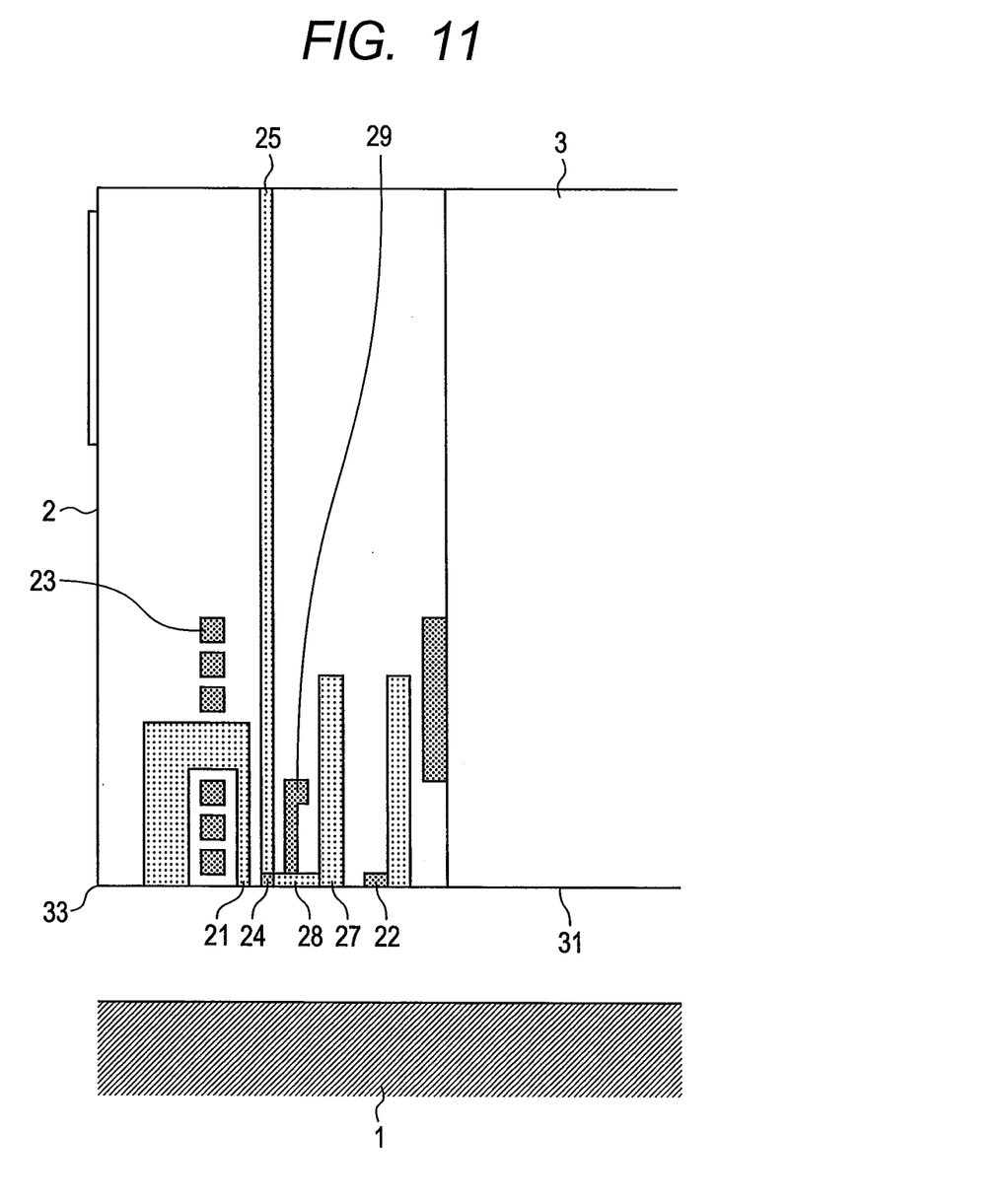
FIG. 11 is a sectional view of the thermally assisted magnetic recording head according to fifth and seventh embodiments of the present invention.

A thermally assisted magnetic recording head according to a fifth embodiment of the present invention will be described referring to FIG. 11. FIG. 11 is a cutaway view of the magnetic head 2 taken along the line for connecting midpoints of the leading edge 32 and the trailing edge 33 shown in FIG. 2. The magnetic head 2 includes the main pole 21, the reader 22, the coil 23, the near-field transducer 24, the waveguide 25, the magnetic film (secondary magnetic pole) 27, and the metal wiring 29. The metal wiring 29 is grounded for preventing the disc 1 from being damaged owing to the discharge.

In the embodiment, the near-field transducer 24 and the magnetic film 27 are connected via the metal body 28 with high thermal conductivity, and the near-field transducer 24 and the metal wiring 29 in the magnetic head are connected when seen from the air bearing surface 31. Accordingly, the heat of the near-field transducer 24 is released to the magnetic film 27 via the metal body 28 so that the magnetic film 27 serves as a heat sink/radiator plate. Furthermore, the heat of the near-field transducer 24 is released to the metal wiring 29 in the magnetic head so that the metal wiring 29 in the magnetic head serves as a heat sink for preventing the temperature of the near-field transducer 24 from becoming locally high.

The aforementioned structure includes features derived from the second and the third embodiments, and is capable of further suppressing temperature rise of the near-field transducer 24 compared with the second and the third embodiments.

Sixth Embodiment

A thermally assisted magnetic recording head according to a sixth embodiment of the present invention will be described referring to FIGS. 4 and 9. The cutaway view of the thermally assisted magnetic recording head taken along the line for connecting midpoints of the leading edge 32 and the trailing edge 33 is the same as the one shown in FIG. 9. The view of the thermally assisted magnetic recording head according to the embodiment seen from the air bearing surface becomes the same as the one shown in FIG. 4.

The magnetic head 2 includes the main pole 21, the reader 22, the coil 23, the near-field transducer 24, the waveguide 25, and the metal wiring 29. The metal wiring 29 in the magnetic head is grounded for preventing the disc 1 from being damaged owing to the discharge.

In the embodiment, the metal film 26 with high thermal conductivity is formed to extend from both sides of the near-field transducer 24 in the width direction of the magnetic head when seen from the air bearing surface 31. The near-field transducer 24 and the metal wiring 29 in the magnetic head are connected. This makes it possible to allow the metal film 26 to serve as a radiator plate for releasing the heat of the near-field transducer 24 to the metal wiring 29 in the magnetic head. The use of the metal wiring 29 in the magnetic head as a heat sink may prevent the temperature of the near-field transducer 24 from becoming locally high.

The aforementioned structure has features derived from the first and the third embodiments, and is capable of further suppressing the temperature rise of the near-field transducer 24 compared with the first and the third embodiments.

Seventh Embodiment

A thermally assisted magnetic recording head according to a seventh embodiment of the present invention will be described referring to FIGS. 10 and 11. The cutaway view of the thermally assisted magnetic recording head taken along the line for connecting midpoints of the leading edge 32 and the trailing edge 33 shown in FIG. 2 is the same as the one shown in FIG. 11. The view of the thermally assisted magnetic recording head according to the embodiment seen from the air bearing surface 31 is the same as the one shown in FIG. 10.

The magnetic head 2 includes the main pole 21, the reader 22, the coil 23, the near-field transducer 24, the waveguide 25, the magnetic film (secondary magnetic pole) 27, and the metal wiring 29. The metal wiring 29 in the magnetic head is grounded for preventing the disc 1 from being damaged owing to the discharge.

In the embodiment, the metal film 26 with high thermal conductivity is formed to extend from both sides of the near-field transducer 24 in the width direction of the magnetic head when seen from the air bearing surface 31. The magnetic film 27 and the near-field transducer 24 are connected via the metal body 28 with high thermal conductivity, and the near-field transducer 24 and the metal wiring 29 in the magnetic head are connected when seen from the air bearing surface 31.

The metal film 26 is used as a radiator plate, and the magnetic film 27 is used as a heat sink/radiator plate for releasing the heat of the near-field transducer 24 to the metal wiring 29 in the magnetic head. The use of the metal wiring 29 as a heat sink may prevent the temperature of the near-field transducer 24 from becoming locally high.

The aforementioned structure includes features derived from the first, second and third embodiments, and is capable of further suppressing the temperature rise of the near-field transducer 24 compared with the first, second and third embodiments.

The thermally assisted magnetic recording head according to the present invention may be employed for a magnetic disc device with high recording density.

What is claimed is:

1. A thermally assisted magnetic recording head provided with a slider and a magnetic head formed on an end surface of the slider,
   wherein the magnetic head includes a reader, a magnetic film, a main pole, a coil, a near-field transducer formed on an air bearing surface near the main pole, and a waveguide for guiding light to the near-field transducer; and
   wherein a metal film is formed near the near-field transducer, the metal film being a radiation plate for releasing heat caused by the near-field transducer and being formed to extend from both sides of the near-field transducer in a widthwise direction of the magnetic head.

2. The thermally assisted magnetic recording head according to claim 1, wherein the metal film is formed of a high thermal conductivity material.

3. The thermally assisted magnetic recording head according to claim 1, wherein the near-field transducer and the magnetic film are connected via a metal body.

4. The thermally assisted magnetic recording head according to claim 3, wherein the magnetic film is a magnetic material other than a primary magnetic pole near the near-field transducer.

5. The thermally assisted magnetic recording head according to claim 1, wherein a metal wiring is formed in the magnetic head, and has one end connected to the near-field transducer and another end grounded.

6. A thermally assisted magnetic recording head provided with a slider and a magnetic head formed on an end surface of the slider,
   wherein the magnetic head includes a reader, a magnetic film, a main pole, a coil, a near-field transducer formed on an air bearing surface near the main pole, and a waveguide for guiding light to the near-field transducer; and
   wherein the near-field transducer and the magnetic film are connected via a metal body for releasing heat caused by the near-field transducer to the magnetic film.

7. The thermally assisted magnetic recording head according to claim 6, wherein the metal body is formed of a high thermal conductivity material.

8. The thermally assisted magnetic recording head according to claim 6, wherein the magnetic film is a magnetic material other than a primary magnetic pole near the near-field transducer.

9. The thermally assisted magnetic recording head according to claim 6, wherein a metal wiring is formed in the magnetic head, and has one end connected to the near-field transducer and another end grounded.

10. A thermally assisted magnetic recording head provided with a slider and a magnetic head formed on an end surface of the slider,
    wherein the magnetic head includes a reader, a magnetic film, a main pole, a coil, a near-field transducer formed on an air bearing surface near the main pole, and a waveguide for guiding light to the near-field transducer; and
    a metal wiring is formed in the magnetic head, and has one end connected to the near-field transducer and another end grounded, the metal wiring releasing heat caused by the near-field transducer and functioning as a heat sink.

11. The thermally assisted magnetic recording head according to claim 10,
    wherein a metal film is formed near the near-field transducer; and
    the near-field transducer and the magnetic film are connected via a metal body.

12. The thermally assisted magnetic recording head according to claim 11, wherein each of the metal film and the metal body is formed of a high thermal conductivity material.

13. The thermally assisted magnetic recording head according to claim 11, wherein the metal film is formed to extend from both sides of the near-field transducer in a widthwise direction of the magnetic head.

14. The thermally assisted magnetic recording head according to claim 11, wherein the magnetic film is a magnetic material other than a primary magnetic pole near the near-field transducer.

* * * * *